UNITED STATES PATENT OFFICE.

ROBERT CONN AND OTTO HUGO SHULTZ, OF VERNON, BRITISH COLUMBIA, CANADA.

PROCESS OF MAKING ARTIFICIAL STONE.

1,153,032.     Specification of Letters Patent.     Patented Sept. 7, 1915.

No Drawing.     Application filed July 3, 1914. Serial No. 849,001.

*To all whom it may concern:*

Be it known that we, ROBERT CONN and OTTO H. SHULTZ, citizens of Canada, residing at Vernon, in the Province of British Columbia and Dominion of Canada, have invented new and useful Improvements in Processes of Making Artificial Stone, of which the following is a specification.

Our invention relates to a process of making artificial stone.

The object of the invention is to provide a process by which artificial marble or other stone may be produced in exact simulation of the natural stones, and whereby artificial stone which is both fire and water proof, of maximum strength and durability and of great density may be easily and conveniently produced.

In carrying our invention into practice, we first take one part of concentrated sulfuric acid and three parts of plumbic oxid (litharge) and mix the two together in a suitable vessel, the mixture being stirred thoroughly until reaction ceases. We then prepare a solution of 175 parts of magnesium chlorid in 226 parts of water, and add this solution to the mixture formed from the sulfuric acid and plumbic oxid, stirring continuously all the while until reaction again ceases. We also prepare a dry mixture of 210 parts of calcium sulfate (satin spar), magnesium carbonate, 105 parts, and sand or gravel, 280 parts. These are thoroughly mixed together in a dry state, and to this dry mixture is added the wet mixture of sulfuric acid, plumbic oxid, and magnesium chlorid which are thoroughly combined by agitation in a suitable vessel. The wet mixture in the process of combination is gradually added to the dry mixture, and the mass thoroughly stirred or agitated until all reaction ceases. In the combination of the two mixtures it is essential to effect the mixture under a thorough stirring or agitation, on account of the reactions which occur, whereby certain gases such as carbon dioxid are formed, which must be liberated from the mixture and allowed to escape in order to prevent the composition from becoming porous and preventing the particles from properly setting. As soon as all reaction of the mass ceases the composition is completed and ready for use, such composition being in a plastic condition so that it may be filled within molds for the production of stones or articles of the desired shapes.

Prior to its introduction into the mold the composition is allowed to cool to a temperature of from 70° to 80° F., at which temperature the composition is best adapted for the molding operation. The molds may be of any suitable form and construction, for the production of different kinds of artificial rocks or stones. For the production of stones having a glazed surface, glass or polished metal molds are used. For the production of stones having a dull surface molds of wood and other cheap material satisfactorily fulfil the purpose. The composition is allowed to remain in the mold until it has set to a desired degree, which occurs in from 10 to 12 hours.

For the production of colored stones when so desired, vegetable coloring or anilin dyes may be added to the dry mixture or composition. For a color or tint, the coloring matter may be added to the dry mixture before adding the acid, litharge and magnesium chlorid. In producing artificial marble or other streaked or grain stones, the color is added to the mixture after it is poured into the molds, the design being produced by means of paddles or suitable brushes.

By the use of the materials and process described, we produce an artificial marble or other stone which not only closely simulates the natural stone, but which is moisture and fire-proof and of great density, hardness, and durability. The stone so produced withstands a heat test of approximately 700° F., and a crushing pressure of approximately 3,000 lbs., and is also impervious to moisture and to atmospheric changes. We find that this is due to the character of the ingredients and especially to the method of combination whereby all gases are eliminated and the particles of the mass allowed to set without voids or the retention of air or gases. The proportions given are thus found best adapted for the purpose, although we find that they may be varied to some considerable degree, and thence we do not limit the proportions to those particularly defined.

We claim:—

The herein-described process of making an artificial stone composition, which consists in mixing one part of concentrated sulfuric acid with 3 parts of plumbic oxid and stirring until reaction ceases, dissolving 175 parts of magnesium chlorid in 226 parts of water, adding the solution to the mixture and stirring continuously until reaction again ceases, preparing a dry mixture of 210 parts of calcium sulfate, 105 parts of magnesium carbonate, and 280 parts of sand, adding the wet mixture first prepared to the dry mixture, and stirring the mass to eliminate all gases in combining the mixtures until all reaction ceases.

In testimony whereof we affix our signatures in presence of two witnesses.

ROBERT CONN.
OTTO HUGO SHULTZ.

Witnesses:
PETER DICKSON,
ARTHUR SMITH.

Copies of this patent may be obtained for five cents each, by addressing the "Commissioner of Patents, Washington, D. C."